No. 689,335. Patented Dec. 17, 1901.
R. McK. THOMAS.
JUNCTION BOX FOR ELECTRICAL CONDUITS.
(Application filed June 20, 1901.)
(No Model.)

Witnesses
Ivan Königsberg
Bert C. Jones

Inventor
Robert McK. Thomas
By his Attorney
Alexander C. Proudfit

UNITED STATES PATENT OFFICE.

ROBERT McK. THOMAS, OF NEW YORK, N. Y., ASSIGNOR TO THOMAS & BETTS, OF NEW YORK, N. Y.

JUNCTION-BOX FOR ELECTRICAL CONDUITS.

SPECIFICATION forming part of Letters Patent No. 689,335, dated December 17, 1901.

Application filed June 20, 1901. Serial No. 65,345. (No model.)

*To all whom it may concern:*

Be it known that I, ROBERT McK. THOMAS, of New York, State of New York, have invented certain Improvements in Junction-Boxes for Electrical Conduits, of which the following description, in connection with the accompanying drawings, is a specification, like numerals on the drawings designating like parts.

Outlet or junction boxes as constructed at present are placed against the wall when installed in buildings at a depth which will bring the outer edge of the box or the face of its cover to a point where the box will be concealed by the plaster, but will offer a suitable seat for the fixture, switch, or other member which projects beyond the plaster. No provision, however, has been made for regulating the depth of the box itself to enable its outer surface to be adjusted axially and held positively in adjusted position with reference to the plaster, and accordingly difficulty is often found in setting the box in such position as to secure proper presentation of its outer surface for the receipt of fixtures, &c. To accomplish the provision of a box or analogous conduit member with such adjustment and a "universal" box of simpler and cheaper construction than those at present on the market are among the objects of my invention, the various features whereof will be illustrated and described fully in the accompanying drawings and specification.

Figure 2:
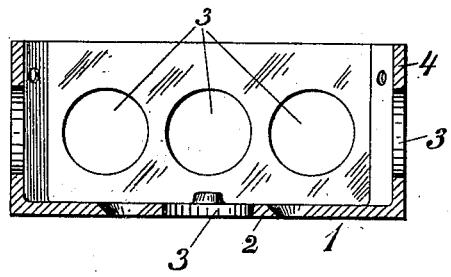
Figure 3:
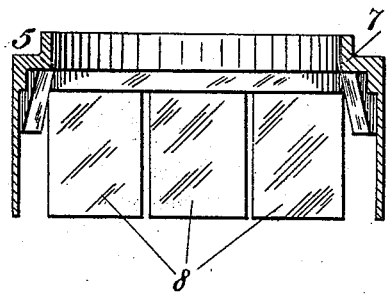
Figure 1:
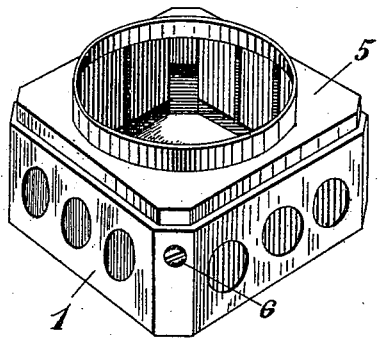
Figure 4:
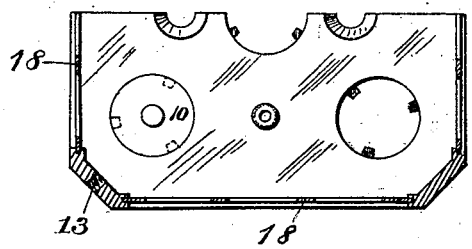

In the drawings, Figure 1 illustrates in perspective an outlet or junction box for electrical conduits in the construction whereof my invention has been embodied. Fig. 2 shows in vertical medial section, Fig. 1, the base member of said box. Fig. 3 shows in vertical medial section, Fig. 1, the cover member of the box. Fig. 4 is a plan view of part of a modified form of construction of the base member, and Fig. 5 shows in vertical section a box similar to that illustrated in Fig. 1 with one of the masking portions removed from the top member.

In the construction selected as a convenient form for illustration and description to enable a ready understanding of my improvements the reference-numeral 1 designates the base member of an outlet or junction box for electrical conduits, which box may be of any desired shape, taking in the illustration the form of a square box having a bottom 2, provided, preferably, with apertures 3, to be closed by any well-known or suitable means, similar apertures 3 being provided in the sides 4.

The reference-numeral 5 designates the coöperating box member, in this instance square and of a size to fit snugly within the member 1, so that the two members can be adjusted telescopically with reference to each other and held in adjusted telescopic relation by any suitable means—as, for example, the set-screw 6.

Figure 5:
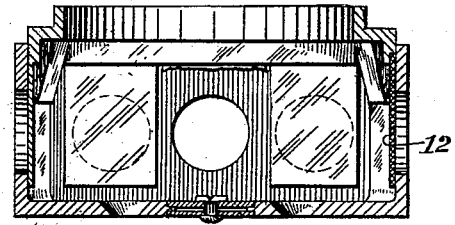

While the member 5, which for the sake of convenience I will designate as the "cover member," may be of any convenient shape and construction, it will preferably conform to the peripheral contour of the base member, and a convenient form of cover member is presented in the drawings, comprising a top portion 7, from which extend lateral masking portions 8, separated preferably by slits or interspaces and formed integrally or of sheet metal cast in, as at 12, Fig. 5. These masking portions are designed to extend opposite the apertures in the sides of the base member to close said apertures, and preferably there will be one masking portion for each aperture, although I do not limit myself to such provision nor to any definite number of apertures or masking portions.

To enable access to the box through any desired aperture, it will be sufficient to form the masking portions of frangible material, so that by a blow of the hammer or a twist of a wrench individual masking portions may be removed without disturbing other masking portions in the series, and in Fig. 5 the middle masking portion has been removed.

In Fig. 4 I have shown a modified form of base member, in which the sides 18 are formed of sheet metal cast in position, it being understood that this will receive a cover member of the kind already described or any suitable telescoping coöperating member in accordance with my invention, and other modifications of contour and material will occur to those skilled in the art.

Having thus described my invention fully, it will be understood that I do not limit myself to the exact construction illustrated and described, nor to any specific material, nor in general otherwise than as set forth in the claims read in connection with this specification.

Having thus described my invention, what I claim, and that on which I desire protection, is—

1. A junction or outlet box for interior conduits; comprising a plurality of telescoping members adjustable axially relatively to each other, and means intermediate said members to hold said members positively in adjusted telescopic relation, substantially as described.

2. A box of the class described; comprising an outer member apertured laterally; an inner member adjustable telescopically within said outer member and having sides to close said apertured portion of said outer member; and means to hold said members in adjusted position, substantially as described.

3. A box or device of the class described; comprising a base member having lateral apertures; and a cover member having lateral masking means to extend within said base member and close said apertured portion thereof, said masking means extending beyond the limits of the aperture to be closed.

4. A box or device of the class described; comprising a base member having a series of circular lateral apertures; and a cover member having a series of lateral masking portions to extend opposite and close said lateral apertures, individual members of said series being removable to unmask the opposite aperture.

5. A box or device of the class described; comprising a bottom member formed of a cast-metal frame with apertured sheet-metal sides cast in place; and a top member having a series of lateral masking portions to extend opposite and close said lateral apertures, individual members of said series being removable to unmask the aperture or apertures opposite.

6. A junction or outlet box for interior conduits, comprising a plurality of telescoping members adjustable axially relatively to each other, and a set-screw carried by one of said members to bear against and hold positively in adjusted axial position the coöperating member, substantially as described.

7. A junction or outlet box for interior conduits, comprising a plurality of telescoping members adjustable coaxially, and a plurality of set-screws carried by one of said members to bear against the periphery of the coöperating member and hold said members in adjusted coaxial relation, said set-screws moving at an angle to the axis of said member against which they bear.

In testimony whereof I have signed my name to this specification in the presence of two subscribing witnesses.

ROBT. McK. THOMAS.

Witnesses:
ALEXANDER C. PROUDFIT,
EDWIN A. WATSON.